(12) United States Patent
Sanders et al.

(10) Patent No.: US 8,207,097 B2
(45) Date of Patent: *Jun. 26, 2012

(54) DEGRADABLE GELS IN ZONAL ISOLATION APPLICATIONS

(75) Inventors: Mark Sanders, Scotland (GB); David Antony Ballard, Scotland (GB)

(73) Assignee: M-I L.L.C., Houston, TX (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/666,016

(22) PCT Filed: Jun. 27, 2008

(86) PCT No.: PCT/US2008/068478
§ 371 (c)(1),
(2), (4) Date: Mar. 25, 2010

(87) PCT Pub. No.: WO2009/006253
PCT Pub. Date: Jan. 8, 2009

(65) Prior Publication Data
US 2010/0197528 A1     Aug. 5, 2010

Related U.S. Application Data

(60) Provisional application No. 60/946,882, filed on Jun. 28, 2007.

(51) Int. Cl.
*C09K 8/72* (2006.01)
(52) U.S. Cl. ............................................... 507/277
(58) Field of Classification Search .................. 507/277
See application file for complete search history.

(56) References Cited

U.S. PATENT DOCUMENTS

| 5,413,178 A | 5/1995 | Walker et al. |
| 2005/0006093 A1 | 1/2005 | Nguyen |
| 2005/0227874 A1 | 10/2005 | Berger et al. |
| 2006/0144592 A1 | 7/2006 | Hanes et al. |

FOREIGN PATENT DOCUMENTS

CA     2526673 A1     12/2004

OTHER PUBLICATIONS

Office Action issued in Corresponding Canadian Application No. 2,606,541 dated Dec. 8, 2010 (3 pages).
Extended Search Report issued in corresponding European Application No. 08781055.2 dated May 31, 2011 (7 pages).
Office Action issued in corresponding Eurasian Application No. 201070074 dated Aug. 30, 2011 (2 pages).
Office Action issued in corresponding Columbian Application No. 07-105.875 (7 pages).
Office Action issued in corresponding Mexican Application No. MX/a/2007/012557 dated Oct. 21, 2011 (4 pages).
International Search Report from PCT/US2008/068478 dated Jan. 30, 2009 (2 pages).
Written Opinion from PCT/US2008/068478 dated Jan. 30, 2009 (4 pages).
Office Action issued in corresponding Eurasian Application No. 201070074; dated Feb. 1, 2012 (2 pages).

*Primary Examiner* — Alicia Toscano
(74) *Attorney, Agent, or Firm* — Osha • Liang LLP

(57) ABSTRACT

A method of treating a formation that includes emplacing an oxidizing breaker fluid into a region of the formation occupied by a gel; and allowing sufficient time for the oxidizing breaker fluid to degrade the gel is disclosed.

15 Claims, No Drawings

DEGRADABLE GELS IN ZONAL ISOLATION APPLICATIONS

BACKGROUND OF INVENTION

1. Field of the Invention

Embodiments disclosed herein relate generally to chemically degradable gels and breaker systems for degrading gels formed downhole.

2. Background Art

Lost circulation is a recurring drilling problem, characterized by loss of drilling mud into downhole formations that are fractured, highly permeable, porous, cavernous, or vugular. These earth formations can include shale, sands, gravel, shell beds, reef deposits, limestone, dolomite, and chalk; among others. Other problems encountered while drilling and producing oil and gas include stuck pipe, hole collapse, loss of well control, and loss of or decreased production.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

During the drilling process muds are circulated downhole to remove rock as well as deliver agents to combat the variety of issues described above. Mud compositions may be water or oil-based (including mineral oil, biological, diesel, or synthetic oils) and may comprise weighting agents, surfactants, proppants, and gels. In attempting to cure these and other problems, crosslinkable or absorbing polymers, loss control material (LCM) pills, and cement squeezes have been employed. Gels, in particular, have found utility in preventing mud loss, stabilizing and strengthening the wellbore, and zone isolation and water shutoff treatments.

While there have been an increasing number of developments in gel technology for use downhole, stable gels that may subsequently be chemically degraded by application of a breaker system may find use in situations where a gel has been misplaced or needs subsequent removal from the formation.

Accordingly, there exists a continuing need for developments in gel technology and means for chemically degrading gels formed downhole.

SUMMARY OF INVENTION

In one aspect, embodiments disclosed herein relate to a method of treating a formation that includes emplacing an oxidizing breaker fluid into a region of the formation occupied by a gel; and allowing sufficient time for the oxidizing breaker fluid to degrade the gel.

Other aspects and advantages of the invention will be apparent from the following description and the appended claims.

DETAILED DESCRIPTION

In one aspect, embodiments disclosed herein relate to chemically degradable gels and breaker systems for degrading gels formed downhole. In other aspects, embodiments disclosed herein relate to methods of treating formations occupied by a sealing gel.

Chemically Degradable Gels

Gels of the present disclosure may include those, for example, formed by the crosslinking of gelling agents. In some embodiments, gelling agents, or the materials to be crosslinked, may include lignins, lignosulfonates, tannins, tannic acids, and combinations thereof. In other embodiments, materials to be crosslinked may include modified lignins, modified lignosulfonates, modified tannins, modified tannic acids, and combinations thereof. In certain embodiments, tannins may be modified to have a higher phenol content. In certain other embodiments, tannins may be treated with amines.

In other embodiments, gelling agents may include biopolymers, starches, carboxy methyl cellulose, polyacrylates, polyacrylamides, and combinations thereof. In other embodiments, gelling agents may include polyamines such as diethylene triamine and triethylene tetramine, and the like. In yet other embodiments, gelling agents may include polyether amines, poly vinyl amines and polyethylene imines.

In some embodiments, starches may include natural starches, chemically modified starches, and mixtures of one or more natural and/or chemically modified starches. Natural starches may include those of potato, wheat, tapioca, rice, corn, and roots having a high starch content, among others. Chemically modified starches may include carboxymethyl starch, hydroxyethyl starch, hydroxypropyl starch, acetate starch, sulfamate starch, phosphate starch, and nitrogen modified starch, among others. In yet other embodiments, combinations of any of the above listed materials to be crosslinked may be used.

The desired gel may be achieved by reacting the above gelling agents and a crosslinking agent. In some embodiments, the crosslinking agent may include ethylene glycol diglycidyl ether, propylene glycol diglycidyl ether, butylene glycol diglycidyl ether, sorbitol polyglycidyl ether, aziridine derivatives, carbodiimide, blocked isocyanates, epoxy functionalized polyalkalene glycols, an oxidized starch (polymeric dialdehyde), and combinations thereof.

In other embodiments, the crosslinking agent may include an acetal that can be hydrolized to produce the aldehyde in situ. For example, the crosslinking agent may include an aldehyde adduct, a tetra methoxy propane, or the bisulphite addition compounds of the aldehydes. For example, a formaldehyde adduct may be formed by reacting formaldehyde and a compound selected from sulfurous acid and its water soluble salts, such as the alkali metal salts (e.g., sodium or potassium salts). In one embodiment, the salt used may be sodium bisulfite. In addition to using the alkali metal salts, ammonium and tertiary amine salts of sulfurous acid such as ammonium bisulfite or trimethylamine sulfite may be used to form an adduct.

In other embodiments, the crosslinking agent may be a diepoxide or a triepoxide. In yet other embodiments, the crosslinking agent may include trimethylolpropane triglycidyl ether, diglycidyl ether of neopentyl glycol, epoxidized 1,6-hexanediol, 1,4-butanediol diglycidyl ether (BDDGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether, or combinations thereof.

The formation of such gels is described in U.S. patent application Ser. Nos. 11/737,632 and 61/031,577, which are assigned to the present assignee and incorporated herein by reference in their entirety. The inventor of the present application has discovered an appropriate breaker system that may allow for the placement and subsequent removal of gel, allowing for greater applicability of the gels and increased success. Further, while the above described gel includes tannins, lignins, etc., crosslinked with epoxy-based crosslinking agents, it is also contemplated that the breaker systems may also be used in other types of gels, for example, elastomer-type gels, such as polyurethanes and polyureas. Such gels are described, for example, in U.S. Patent Application Nos. 60/942,346 and 60/914,604, and PCT Application Nos. PCT/US08/61272 and PCT/US08/61300, which are assigned to the present assignee and herein incorporated by reference in their entirety. Polyureas and polyurethanes may be formed by the reaction of a blocked isocyanate with an active hydrogen compound, i.e., polyamine and polyol, respectively. Polyurethane gels may also include gels formed from silane endcapped polyurethane prepolymers that may be crosslinked via a moisture cure. Additionally, it is also within the scope of the present disclosure that the elastomeric gels may also contain some isocyanurate functionality therein and/or may be combined with one or more epoxy or other gels to form a hybrid gel.

Gel Properties

The hardness of the gel is the force necessary to break the gel structure, which may be quantified by measuring the force required for a needle to penetrate the crosslinked structure. Hardness is a measure of the ability of the gel to resist to an established degree the penetration of a test needle driven into the sample at a constant speed.

Hardness may be measured by using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 2.5 mm diameter, cylindrical, flat faced probe into the gel sample at a constant speed of 30 mm per minute. When the probe is in contact with the gel, a force is applied to the probe due to the resistance of the gel structure until it fails, which is recorded via the load cell and computer software. As the probe travels through the sample, the force on the probe and the depth of penetration are measured. The force on the probe may be recorded at various depths of penetration, such as 20, 25, and 30 mm, providing an indication of the gel's overall hardness. For example, the initial peak force may be recorded at the point the gel first fails, close to the contact point, followed by recording highest and lowest values measured after this point where, the probe is travelling through the bulk of the gel.

In some embodiments, gel of the present disclosure may have a hardness value from 2 to 20000 gram-force. In other embodiments, the resulting gel may be a soft elastic gel having a hardness value in the range from 2 to 20 gram-force. In other embodiments, the resulting gel may be a firm gel having a hardness value from 20 to 100 gram-force. In other embodiments, the resulting gel may range from hard to tough, having a hardness value from 100 to 20000 gram-force; from 300 to 15000 gram-force in other embodiments; from 500 to 10000 gram-force in yet other embodiments; from 1000 to 9000 gram-force in yet other embodiments.

In other embodiments, the hardness of the gel may vary with the depth of penetration. For example, the gel may have a hardness of 300 gram-force or greater at a penetration depth of 20 mm in some embodiments. In other embodiments, the gel may have a hardness of 1000 gram-force or greater at a penetration depth of 20 mm; 3,000 gram-force or greater at a penetration depth of 20 mm in other embodiments; and 5000 gram-force or greater at a penetration depth of 25 mm in yet other embodiments.

With respect to the variables listed above (i.e. temperature, time, etc.), those having ordinary skill in light of the disclosure will appreciate that, by using the present disclosure as a guide, properties may be tailored as desired.

Viscosity

The viscosity of the gel composition may be affected by the concentrations of one or more of the gelling agent, viscosifier, and solids present in the composition. As the concentrations of the gelling agent, viscosifier, or solids increase, the viscosity of the gel composition will increase. In some embodiments, the concentration of the gelling agent may range from 8-25% by weight. In other embodiments, the concentration of the gelling agent may range from 10-20% by weight. In yet other embodiments, the concentration of the gelling agent may range from 11-17%.

Viscosity may be measured by using a Brookfield DV-II+ Viscometer. One of skill in the art will appreciate that the viscosity measurements will be dependent upon the temperature of the gel composition, the type of spindle, and the number of revolutions per minute. The viscosity ranges disclosed herein were measured at 20° C. using a Brookfield DV-II+ Viscometer with a LV2 spindle. The viscosity may be measured by lowering the viscometer into the center of the sample until the spindle is immersed the middle of the immersion mark. Care should be taken not to trap air under the spindle. The viscometer can be started after adjusting the viscometer to the desired RPM. If more than one RPM is to be used, the viscometer should be started at the lowest desired RPM. This reduces the amount of shear introduced to the sample, resulting in more accurate readings at lower RPM's.

In some embodiments, the mixing of the gelling agent and the crosslinking agent may produce gel compositions having an initial viscosity ranging from approximately 500 centipoise to 20,000 centipoise measured at 20° C. using an LV2 spindle at low rotational speeds (12 rpm or less). In other embodiments, the mixing of the gelling agent and the crosslinking agent may produce gel compositions having an initial viscosity ranging from approximately 1000 centipoise to 5,000 centipoise measured at 20° C. using an LV2 spindle at low rotational speeds (12 rpm or less). As used herein, initial viscosity refers to the viscosity of the composition prior to substantial reaction of the crosslinking agent and gelling agent.

Break Through Pressure

The break through pressure of the gel may also show the sealing properties of the gels. Break through pressure may be measured using a Permeability Plugging Apparatus. One of skill in the art will appreciate that the break through pressure measurements will be dependent upon the temperature of the gel composition, setting time, etc. The break through pressure may be measured by pumping and allowing the gels to set/age for a sufficient period of time on a porous substrate, such as a ceramic disk or sandstone core followed by testing the application of pressure to the substrate containing the gel therein. For example, the gelled substrate may be placed in a test apparatus with a brine solution adjacent the substrate. Pressure on the brine may be increased, and the pressure at which the brine begins to flow through the disc (if any) may be recorded as the breakthrough pressure. Gels of the present disclosure may, in some embodiments, possess a break through pressure of greater than 1000 psi.

Breaker Fluid

Breaker fluids that may chemically degrade the gels of the present disclosure may include oxidizing breaker fluids containing for example a base fluid and an oxidizing agent. Suitable oxidizing agents may include hypochlorites, such as lithium and/or sodium hypochlorite and peroxides (including peroxide adducts), other compounds including a peroxy bond such as persulphates, perborates, percarbonates, perphosphates, and persilicates. In a particular embodiment, a peroxide, such as magnesium or calcium peroxide, may be used in the breaker system of the present disclosure. Further, in various embodiments, the effective concentration of the oxidizing agent may range from about 1 lb/bbl to about 50 lbs/bbl, or up to 25 percent by volume in another embodiment. However, one of ordinary skill in the art would appreciate that the amount of oxidizing agent in a particular applicant may depend, for example, on the type (and strength) of oxidant used.

Certain embodiments of the present disclosure use oxidative breakers that have been encapsulated, which may optionally be emplaced downhole in the gelling or gel-forming fluid as an internal oxidant. For the purposes of the present disclosure, an encapsulated oxidative breaker is an oxidant that has a coating sufficient to control the release of oxidant until a set of conditions selected by the operator occurs. Some general encapsulating materials may include natural and synthetic oils, natural and synthetic polymers and enteric polymers and mixtures thereof. However, many methods of encapsulating may alternatively be used without departing from the scope of the present disclosure. Further, other internal oxidants may include solid oxidants, such as magnesium or calcium peroxide, which or may not be encapsulated. Thus, where an internal oxidant is used in the gelling fluid, alter the gelling fluid is placed downhole and gels, the internal oxidant may be triggered to begin degrading the gel.

Many methods may be used to cause the trigger or release of the oxidant upon the occurrence of specific conditions desired by the operator. For example, the oxidant could be caused to be released by a change in temperature, pressure, pH, abrasion or any number of these or other environmental factors. In a particular embodiment, the method by which the oxidant is released from the encapsulating material for the purposes of degrading a formed gel in a subterranean well is by having the oxidant triggered or released from the encapsulating material upon a change in pH in the down hole environment.

When using encapsulated oxidants, a suitable coating polymer should preferably form a film around the oxidant, and may be chosen such that the coating will remain substantially intact until the desired release conditions occur, for example, a change in pH for the purposes of filter cake removal. In a particular embodiment, the encapsulating material includes enteric polymers, which are defined for the purposes of the present disclosure, as polymers whose solubility characteristics are pH dependent. Here, this means that oxidant release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the oxidative breaker under predetermined conditions of pH or pH and temperature. For example the Glascol family of polymers are acrylic based polymers (available form Ciba Specialty Chemicals) are considered suitable enteric polymers for the present disclosure because the solubility depends upon the pH of the solution.

Applications

Embodiments of the gels disclosed herein may possess greater flexibility in their use in wellbore and oilfield applications. For example, the chemically degradable gels may be used in applications including: zonal isolation in enhanced oil recovery (EOR); loss circulation; wellbore (WB) strengthening treatments; reservoir applications such as in controlling the permeability of the formation, etc. By having means for chemically degrading the gels described herein, once the gel is formed downhole, it may be removed following use or removed in the case of misplacement by the operator. Thus, in various embodiments, a gel of the present disclosure may be emplaced in a region of a wellbore or formation, allowed to gel, and then the gel may be removed using the breaker fluids or internal breakers disclosed herein, due to misplacement of the gel or cessation of the need for the gel.

Examples

Several gel systems were tested for their sealing properties using a Permeability Plugging Apparatus (PPA), as well as their chemical breakability. The gel systems tested include FORM-A-PLUG® II, FORM-A-SET® AK, EMS-8400, and AKL, all of which are available from M-I LLC (Houston, Tex.).

The experimental procedure is as follows:

1. The PPA assembly and the ceramic disc were heating to 140° F. Test samples were mixed, loaded, and tested immediately in the apparatus using 10 micron and 60 micron ceramic discs at 140° F. and 500 psi.

2. Fluid was flowed through the disc for 30 minutes, or until flow ceased.

3. The samples were then left in the PPA cell for 16 hours at 140° F. and ambient pressure.

4. After 16 hours of static heat aging, the PPA cell was opened, the gelled fluid below the disc was removed and any filter cake on the disc surface was carefully removed.

5. 10% NaCl brine was placed in the PPA sample chamber and the cell was reassembled and tested again as the first step described above.

6. Pressure on the brine was increased in 100 psi increments at 10 minute intervals to a maximum of 1,000 psi. The pressure at which brine began to flow through the disc (if any) was recorded as the breakthrough pressure.

Samples tested in the PPA include the following, all in 10% NaCl:

FORM-A-PLUG® II with no $CaCO_3$ bridging solids
FORM-A-PLUG® II with 50 ppb $CaCO_3$ bridging solids
FORM-A-PLUG®II with 100 ppb $CaCO_3$ bridging solids
FORM-A-SET® AK with no $CaCO_3$ bridging solids FORM-A-SET® AK with 50 ppb CaCO$_3$ bridging solids
FORM-A-SET® AK with 100 ppb CaCO$_3$ bridging solids
EMS-8400 with no CaCO$_3$ bridging solids
EMS-8400 with 50 ppb CaCO$_3$ bridging solids
 The results were as follows:

| System | Break Through Pressure (psi) |
|---|---|
| FORM-A-PLUG® II with no CaCO$_3$ bridging solids | <100 |
| FORM-A-PLUG® II with 50 ppb CaCO$_3$ bridging solids | <100 |
| FORM-A-PLUG® II with 100 ppb CaCO$_3$ bridging solids | <100 |

-continued

| System | Break Through Pressure (psi) |
|---|---|
| FORM-A-SET® AK with no CaCO$_3$ bridging solids | <100 |
| FORM-A-SET® AK with 50 ppb CaCO$_3$ bridging solids | <100 |
| FORM-A-SET® AK with 100 ppb CaCO$_3$ bridging solids | <100 |
| EMS-8400 with no CaCO$_3$ bridging solids | >1000 |
| EMS-8400 with 50 ppb CaCO$_3$ bridging solids | >1000 |
| EMS-8400 - no CaCO$_3$ bridging solids with −25% EMI-1706 and +25% EMI-1708 | >1000 |
| EMS-8400 - no CaCO$_3$ bridging solids with −25% EMI-1706 | >1000 |

Compressive Strength Measurements

Unconfined compressive strength measurements were conducted on the QTS texture analyzer. The QTS analyzer presses a cylindrical steel rod into the gelled sample at a programmed rate and measures the psi required to break through the surface of the gelled sample. All samples were static aged at 140° F. for 16 hours before testing. Standard formulation pH was 10.0

The results of the Compressive Strength test were as follows:

| Sample | Compressive Strength (psi) |
|---|---|
| EMS-8400 standard formulation | 24.5 |
| EMS-8400 without EMI-1740 | 22.0 |
| EMS-8400 −25% EMI-1706 | 76.8 |
| EMS-8400 −25% EMI-1044 +25% EMI-1708 | 76.5 |
| EMS-8400 −25% EMI-1044 −25% EMI-1708 | 84.4 |
| EMS-8400 standard formulation at pH 9.0 | 115.3 |
| EMS-8400 standard formulation at pH 9.5 | 147.1 |

Increasing the cross-linker concentration and decreasing the pH appears to increase the compressive strengths of the fluids. However, all of the above formulations sealed the 10 micron ceramic discs to 10% salt water flow to 1,000 psi.

Breaking the Final Gelled Product

Recognizing that the breaking of the gelled product may be desirable, several chemical solutions were tested with the gelled product to determine the most effective treatment.

It was found that sodium and lithium hypochlorite solutions, at concentrations such as 5%, effectively break and dissolve the EMS-8400 gelled material. The results are shown below.

| | | 1 hr | 2 hr | 3 hr | 16 hr | amt of ppt |
|---|---|---|---|---|---|---|
| DI water | Room Temp | no change | no change | no change | no change | none |
| 5% Na hypochlorite | Room Temp | 50% gone | 75% gone | 95% gone | 100% gone | slight, clear |
|  | 140° F. | 100% gone | — | — | — | slight, hazy |
| 5% Li hypochlorite | Room Temp | no change | 25% gone | 50% gone | 100% gone | slight, hazy |
|  | 140° F. | 50% gone | 100% gone | — | — | slight, clear |
| 10% Li hypochlorite | Room Temp | no change | 25% gone | 50% gone | 100% gone | ample, hazy |
|  | 140° F. | 50% gone | 75% gone | 95% gone | 100% gone | ample, hazy |
| 10% Li hypochlorite | Room Temp | 25% gone | 50% gone | 75% gone | 100% gone | ample, hazy |
|  | 140° F. | 50% gone | 75% gone | 95% gone | 100% gone | ample, clear |

Advantageously, embodiments of the present disclosure for gels that may be removed following placement in a formation. In particular, by applying an oxidizing breaker fluid, the gel may be removed. Thus, the combination allows for a gel system that possesses stability with respect to temperature, pH, and pressure changes that may be easily removed upon application of the oxidizing breaker fluid disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of treating a formation, comprising:
emplacing an oxidizing breaker fluid into a region of the formation occupied by a polyurea or polyurethane gel; and
allowing sufficient time for the oxidizing breaker fluid to degrade the gel.

2. The method of claim 1, wherein the oxidizing breaker fluid comprises at least one of a hypochlorite and a peroxide.

3. The method of claim 2, wherein the oxidizing breaker fluid comprises at least one of lithium and sodium hypochlorite.

4. The method of claim 1, wherein the gel comprises at least one of a lignin, a lignosulfonate, a tannin, a tannic acid, a modified lignin, a modified lignosulfonate, a modified tannin, a modified tannic acid, and combinations thereof crosslinked with a crosslinking agent.

5. The method of claim 1, wherein the gel comprises at least one of biopolymers, starches, carboxy methyl cellulose, polyacrylates, polyacrylamides, polyamines, polyetheramines, poly vinyl amines, polyethylene imines, and combinations thereof crosslinked with a crosslinking agent.

6. The method of claim 5, wherein the crosslinking agent comprises at least one of ethylene glycol diglycidyl ether, propylene glycol diglycidyl ether, butylene glycol diglycidyl ether, trimethylolpropane triglycidyl ether, sorbitol polyglycidyl ether, diglycidyl ether of neopentyl glycol, epoxidized 1,6-hexanediol, aziridine derivatives, carbodiimides, blocked isocyanates, epoxy functionalized polyalkalene glycols, an oxidized starch, a polymeric dialdehyde, an aldehyde adduct, a tetra methoxy propane, a hydrolized acetal, and combinations thereof.

7. The method of claim 1, further comprising:
emplacing gel components to form the gel.

8. The method of claim 1, further comprising:
emplacing gel components to form a second gel.

9. The method of claim 1, wherein the gel possesses a break through pressure of greater than 1000 psi.

10. A method of treating a formation, comprising:
emplacing a polyurea or polyurethane gelling fluid comprising an internal oxidizer into the formation wherein the internal oxidizer comprises at least one of calcium peroxide, magnesium peroxide, lithium hypochlorite or sodium hypochlorite;
allowing the gelling fluid to gel in a region of the formation; and
activating the internal oxidizer to break the formed gel.

11. The method of claim 10, wherein the internal oxidant is encapsulated.

12. The method of claim 10, wherein the gel comprises at least one of a lignin, a lignosulfonate, a tannin, a tannic acid, a modified lignin, a modified lignosulfonate, a modified tannin, a modified tannic acid, and combinations thereof crosslinked with a crosslinking agent.

13. The method of claim 10, wherein the gel comprises at least one of biopolymers, starches, carboxy methyl cellulose, polyacrylates, polyacrylamides, polyamines, polyetheramines, poly vinyl amines, polyethylene imines, and combinations thereof crosslinked with a crosslinking agent.

14. The method of claim 13, wherein the crosslinking agent comprises at least one of ethylene glycol diglycidyl ether, propylene glycol diglycidyl ether, butylene glycol diglycidyl ether, trimethylolpropane triglycidyl ether, sorbitol polyglycidyl ether, diglycidyl ether of neopentyl glycol, epoxidized 1,6-hexanediol, aziridine derivatives, carbodiimides, blocked isocyanates, epoxy functionalized polyalkalene glycols, an oxidized starch, a polymeric dialdehyde, an aldehyde adduct, a tetra methoxy propane, a hydrolized acetal, and combinations thereof.

15. The method of claim 10, wherein the gel possesses a break through pressure of greater than 1000 psi.

* * * * *